(12) United States Patent
Kim

(10) Patent No.: US 6,519,256 B1
(45) Date of Patent: Feb. 11, 2003

(54) TECHNIQUE FOR CONSTRUCTING AND CONTROLLING A PRIVATE LINE USING A SWITCHED VIRTUAL CIRCUIT IN AN ATM NETWORK

(75) Inventor: Young-Jin Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/287,085

(22) Filed: Apr. 6, 1999

(30) Foreign Application Priority Data

Apr. 8, 1998 (KR) .......................................... 98-12401

(51) Int. Cl.[7] .............................................. H04L 12/56
(52) U.S. Cl. ..................................................... 370/395.1
(58) Field of Search ................................ 370/395, 230, 370/397, 398, 399, 400, 392

(56) References Cited

U.S. PATENT DOCUMENTS

| | | | |
|---|---|---|---|
| 4,965,804 A | 10/1990 | Trbovich et al. | |
| 5,014,262 A | 5/1991 | Harshavardhana | |
| 5,023,780 A | 6/1991 | Brearley | |
| 5,048,087 A | 9/1991 | Trbovich et al. | |
| 5,200,952 A | 4/1993 | Bernstein et al. | |
| 5,463,621 A * | 10/1995 | Suzuki | 370/60 |
| 5,530,698 A | 6/1996 | Kozaki et al. | |
| 5,539,884 A | 7/1996 | Robrock, II | |
| 5,590,126 A * | 12/1996 | Mishra et al. | 370/329 |
| 5,600,643 A * | 2/1997 | Robrock, II | 370/399 |
| 5,631,903 A | 5/1997 | Dianda et al. | |
| 5,680,396 A | 10/1997 | Moritomo et al. | |
| 5,719,863 A * | 2/1998 | Hummel | 370/392 |
| 5,781,529 A | 7/1998 | Liang et al. | |
| 5,818,842 A * | 10/1998 | Burwell et al. | 370/397 |
| 5,848,068 A | 12/1998 | Daniel et al. | |
| 5,854,789 A | 12/1998 | Lesch et al. | |
| 5,886,982 A | 3/1999 | Kozaki et al. | |
| 5,894,471 A * | 4/1999 | Miyagi et al. | 370/230 |
| 6,339,596 B1 * | 1/2002 | Kozaki et al. | 370/395 |

FOREIGN PATENT DOCUMENTS

JP    10-051456    2/1998

* cited by examiner

Primary Examiner—Hassan Kizou
Assistant Examiner—Anh-Vu H Ly
(74) Attorney, Agent, or Firm—Robert E. Bushnell, Esq.

(57) ABSTRACT

A communication system for allocating a PVC to a user terminal connected through an ATM network interface to an ATM network includes: a PVC control server connected through an ATM interface to the ATM network; a switching system disposed in the ATM network for connecting the user terminal to the PVC control server through an SVC according to a virtual path identifier (VPI) and virtual channel identifier (VCI) generated by the user terminal; and an operator controlled workstation connected to the switching system for checking the state of the switching system, and for generating a signal in accordance with the acceptance or rejection of the user terminal's demand on the PVC. The latter signal is provided to the PVC control server upon receiving PVC demand data from the user terminal through the PVC control server, the acceptance or rejection signal being transferred through the SVC to the user terminal.

11 Claims, 3 Drawing Sheets

TECHNIQUE FOR CONSTRUCTING AND CONTROLLING A PRIVATE LINE USING A SWITCHED VIRTUAL CIRCUIT IN AN ATM NETWORK

CLAIM OF PRIORITY

This application makes reference to, incorporates the same herein, and claims all benefits accruing under 35 U.S.C. §119 from an application for METHOD FOR CONSTRUCTING AND CONTROLLING A PRIVATE LINE BY MEANS OF A SWITCHED VIRTUAL CIRCUIT IN AN ATM NETWORK earlier filed in the Korean Industrial Property Office on the $8^{th}$ of Apr. 1998 and there duly assigned Ser. No. 12401/1998.

BACKGROUND OF THE INVENTION

1. Field of the Invention

The present invention relates to a technique for constructing and managing a private communication line for a user terminal using a switched virtual circuit in an asynchronous transfer mode (ATM) network.

2. Description of the Related Art

Generally an ATM network includes a permanent virtual circuit (PVC) for allocating a fixed channel to a user terminal, and a switched virtual circuit (SVC) connected to the user terminal on the basis of a connection demand, the two circuits being complementarily used. In this case, the user terminal usually uses the SVC to transmit and receive data, and therefore, in order to obtain a private service line, the user must request setting of it by the operator of a telephone exchange office or network control center by calling through a public switched telephone network (PSTN). Then, the operator operates the work station controlling the ATM network connected to the user terminal to check whether its link bandwidth may be allocated to the user terminal. If there remains a portion of the link bandwidth to allow for the user's demand, he sets the PVC by operating the workstation. Thereafter, he notifies the user of the setting by telephone, so that the user may use the PVC. Thus, in order to receive the PVC of the ATM network, the user must call up the operator of the ATM network system through the PSTN. This also requires the operator to control private line services according to the user's demand, degrading the efficiency of controlling the PVC.

The following patents disclose features in common with the present invention but do not teach or suggest the specifically recited technique for constructing and controlling a private line using a switched virtual circuit in an ATM network: U.S. Pat. No. 5,848,068 to Daniel et al, entitled ATM COMMUNICATION SYSTEM INTERCONNECT/ TERMINATION UNIT, U.S. Pat. No. 5,854,789 to Lesch et al., entitled ATM COMMUNICATION SYSTEM WITH A MODULAR STRUCTURE AND COMMUNICATION MODULES, U.S. Pat. No. 5,680,396 to Moritomo et al., entitled COMMUNICATION METHOD, TRANSMISSION APPARATUS, RECEPTION APPARATUS, AND TRANSMISSION LINE BANDWIDTH CONTROL APPARATUS FOR PVC CONNECTION TYPE SWITCHED NETWORK, U.S. Pat. No. 5,886,982 to Kozaki et al., entitled ATM SWITCHING SYSTEM AND CELL CONTROL METHOD, U.S. Pat. No. 5,530,698 to Kozaki et al., entitled ATM SWITCHING SYSTEM AND CELL CONTROL METHOD, U.S. Pat. No. 5,631,903 to Dianda et al., entitled TELECOMMUNICATIONS SIGNALING ARRANGEMENTS FOR TERMINALS WITHOUT SIGNALING CAPABILITY, U.S. Pat. No. 5,200,952 TO Bernstein et al., entitled ADAPTIVE VCP CONTROL IN INTEGRATED SERVICES NETWORKS, U.S. Pat. No. 5,539,884 to Robrock II, entitled INTELLIGENT BROAD BAND COMMUNICATION SYSTEM AND METHOD EMPLOYING FAST-PACKET SWITCHES, U.S. Pat. No. 5,048,087 to Trbovich et al., entitled KEY MANAGEMENT FOR ENCRYPTED PACKET BASED NETWORKS, U.S. Pat. No. 5,023,780 to Brearley, entitled METHOD OF OPERATING A PACKET SWITCHING NETWORK, U.S. Pat. No. 5,014,262 to Harshavardhana, entitled APPARATUS AND METHOD FOR DETECTING AND ELIMINATING CALL LOOPING IN A NODE-BY NODE ROUTING NETWORK, U.S. Pat. No. 4,965,804 to Trbovich et al., entitled KEY MANAGEMENT FOR ENCRYPTED PACKET BASED NETWORKS, and U.S. Pat. No. 5,781,529 to Liang et al., entitled SYSTEMS AND METHODS FOR ROUTING ATM SWITCHED VIRTUAL CIRCUIT CALLS.

SUMMARY OF THE INVENTION

It is an object of the present invention to provide a method of obtaining private line service only through an ATM network without using a PSTN.

It is another object of the present invention to provide a communication system comprising a PVC control server for automatically controlling the PVC in an ATM network.

According to an aspect of the present invention, a communication system for allocating a PVC to a user terminal connected through an ATM network interface to an ATM network comprises: a PVC control server connected through an ATM interface to the ATM network; a switching system disposed in the ATM network for connecting the user terminal to the PVC control server through an SVC according to a virtual path identifier (VPI) and virtual channel identifier (VCI) generated by the user terminal; and an operator controlled workstation connected to the switching system for checking the state of the switching system and for generating a signal representing the acceptance or rejection of the user terminal's demand on the PVC to the PVC control server upon receiving PVC demand data from the user terminal through the PVC control server, the acceptance or rejection signal being transferred through the SVC to the user terminal.

According to another aspect of the present invention, a method of allocating the PVC to the user terminal in a communication system as described above comprises the steps of: demanding a connection to the ATM network by the user terminal generating a predetermined VPI and VCI through a signal channel; connecting the user terminal to the PVC control server in response to the VPI and VCI; sending a connection signal and initial data from the PVC control server to the user terminal; displaying the initial data on the user terminal; sending the PVC demand data to the PVC control server; transferring the PVC demand data to the operator controlled workstation for checking the switching system and for generating the acceptance or rejection signal transferred to the user terminal; and shifting the connection of the user terminal to the PVC upon receiving the acceptance signal.

The present invention will now be described more specifically with reference to the drawings attached only by of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
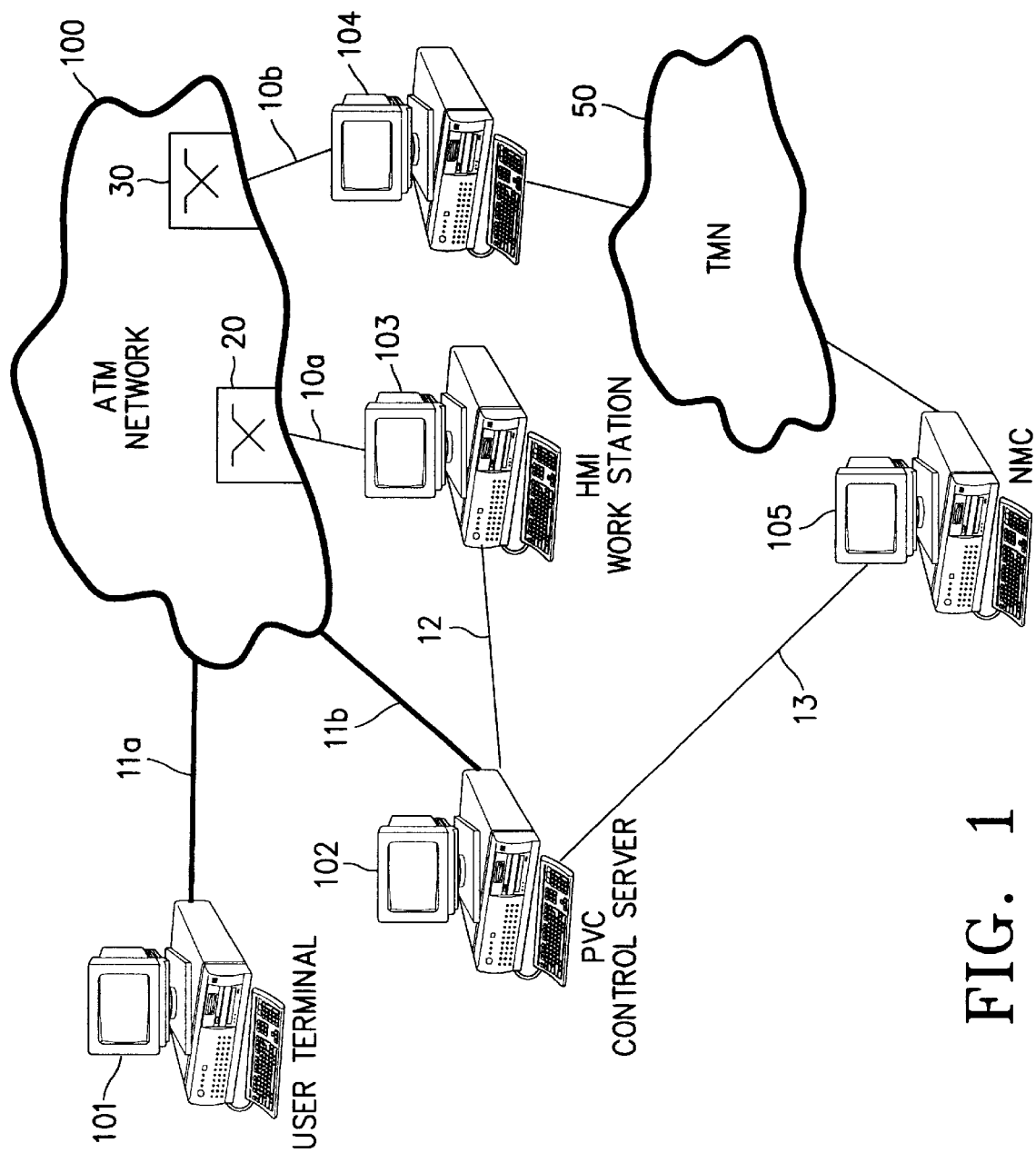
FIG. 1 is a schematic diagram illustrating the construction of an ATM network to perform on-line control of a PVC according to the present invention.

Referring to FIG. 1, a user terminal 101 is connected through an ATM interface line 11a to an ATM network 100, which is provided with a plurality of switching systems 20, 30,... transmitting ATM cell data, and in turn connected to a PVC control server 102 via line 11b.

The PVC control server 102 may be installed in a telephone exchange office or network control center. Of course, the telephone exchange office may serve as the network control center. When the PVC control server 102 is installed in the telephone exchange office, it is connected to an operator controlled workstation 103 to control the switching systems. In this case, the operator controlled workstation 103 is connected through Ethernet line 10a to the ATM switching system 20. In addition, the PVC control server 102 is connected through a data line 12 to the operator controlled workstation 103. In the present case, the PVC control server 102 installed in the telephone exchange office is not connected to the network control computer 105, telecommunication management network (TMN) 50 and switching system control computer 104. Conversely, if the PVC control server 102 is installed in the network control center, it is not connected to the operator controlled workstation 103. On the other hand, if the PVC control server 102 is installed in the telephone exchange office additionally serving as the network control center, the connection is established as shown in FIG. 1.

Describing the operation of the PVC control server 102 installed in the telephone exchange office not serving as the network control center, the operator controlled work station 103 receives the state information concerning the channel allocation of the switching system 20. The user terminal 101 sends a call signal to the ATM network 100 to connect through the ATM line 11b to the PVC control server 102. Thereafter, the user terminal 101 transmits the VPI and VCI through the signal line 11a to connect to the PVC control server 102. The values of the VPI and VCI, for example, are set to VPI=0 and VCI=5. Receiving these values VPI=0 and VCI=5, the switching system of the ATM network 100 connects the user terminal 101 to the PVC control server 102. Then, such connection is the SVC. Of course, the value of the VPI and VCI may be changed as desired. Through this SVC, the user terminal 101 asks the PVC control server 102 for connection to the PVC. To this end, the user terminal generates data representing the transmission speed and service time to use the PVC. This data, which is hereinafter referred to as 'PVC demand data', is transferred to the PVC control server 102, which in turn transfers the PVC demand data to the operator controlled workstation 103. Then, the workstation 103 checks the state of the switching system 20 to determine whether to accept or reject the PVC demand data, transferring a signal representing the acceptance or rejection of the PVC demand data to the PVC control server 102, which in turn sends the acceptance or rejection signal through the ATM network 100 to the user terminal.

On the other hand, describing the operation of the PVC control server 102 installed in the network control center without the operator controlled workstation 103, the PVC control server 102 sends the PVC demand data through a data line 13 to a network management workstation or network management computer (NMC) 105, which is connected through TMN 50 to a workstation 104 to control the ATM switching system 30. The workstation 104 and switching system 30 are connected by means of Ethernet line 10b. The switching system control workstation 104 checks the switching system 30 to determine whether to accept or reject the PVC demand data, as the operator controlled workstation, and then transfers the acceptance or rejection signal through TMN 50 to the workstation 105, which in turn transfers the acceptance or rejection signal to the PVC control server 102. The remaining steps are the same as in the previous case where the PVC control server 102 is installed in the telephone exchange office.

Figure 2:
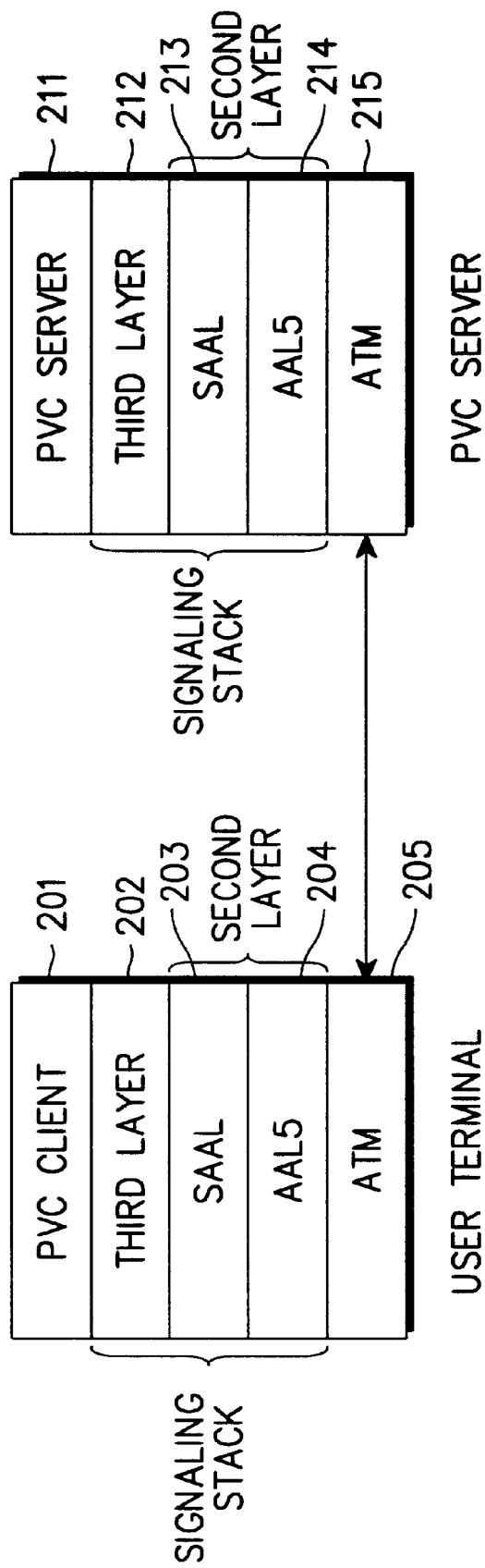
FIG. 2 is a block diagram illustrating the structure of the functional data entry of a user terminal and a PVC control server.

Referring to FIG. 2, the user terminal 101 and PVC control server 102 consist of 4-layer hierarchy. The hierarchical structure of the user terminal 101 consists of PVC client layer 201, third layer 202, second layer 203 and 204, and ATM layer 205. The third layer 202 and second layer 203 and 204 constitute the signaling stack. Since the PVC demand data is transmitted through the signal channel, the second layer consists of the signal ATM adaptation layer (SAAL) 203 and ATM adaptation layer 5 (AAL5) 204. Likewise, the hierarchical structure of the PVC control server 102 consists of PVC server layer 211, third layer 212, second layer 213 and 214, and ATM layer 215. The second layer consists of SAAL 213 and AAL5 214. The third layer 212 and second layer 213 and 214 constitute the signaling stack.

Figure 3:
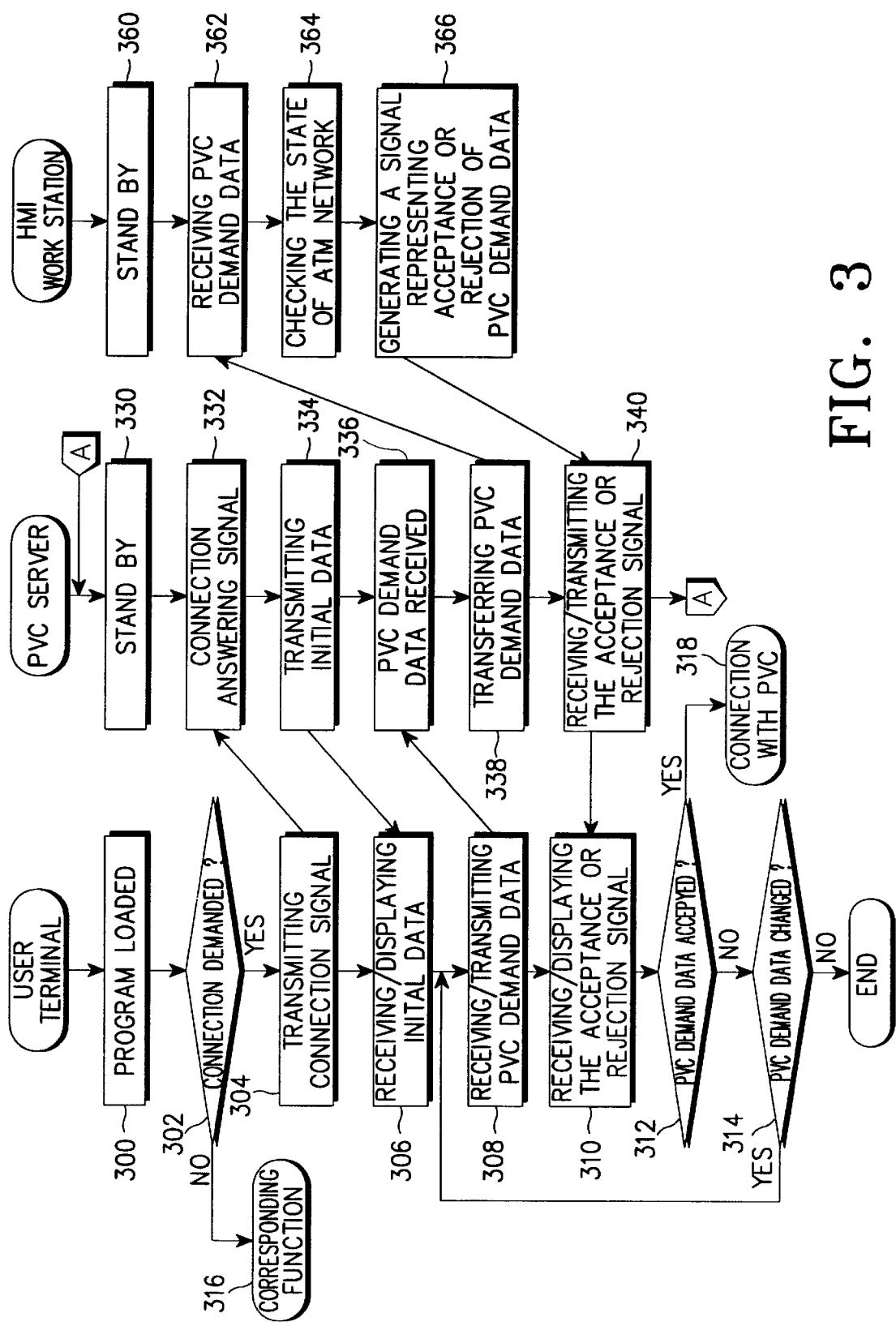
FIG. 3 is a flowchart illustrating the steps for obtaining the PVC by means of an SVC according to an embodiment of the present invention.

Describing the procedure of obtaining the PVC by means of the PVC control server 102 connected to the operator controlled workstation 103 in the telephone exchange office, in connection with FIG. 3, the user terminal 101 loads the program to connect to the ATM network in step 300, and proceeds to step 302 to check whether there is a key input to demand a connect to the ATM network 100. If a signal demanding the connection is detected in step 302, the user terminal 101 goes to step 304; otherwise, it goes to step 316. In step 304, the user terminal 101 generates a connection signal through the signaling stack consisting of the third layer 202, SAAL 203 and AAL5 204, and transfers it through the ATM layer 205 to the ATM network 100. The connection signal is the signal demanding a connection with the PVC. In this case, the signaling stack 202, 203, and 204 generates the values VPI=0 and VCI=5 which are transmitted through the ATM layer 205. Then, the switching system of the ATM network 100 transfers the signal identified as VPI=0 and VCI=5 to the PVC control server 102.

When the PVC control server 102 is on standby in step 330, it receives the connection signal, and it proceeds to step 332 to generate a connection answering signal notifying of establishment of the connection. Then, in step 334, the PVC control server 102 transmits the initial data through the ATM interface fines 11b and 11a to the user terminal 101. Receiving the initial data in step 306, the user terminal 101 displays the received data on the monitor of the operator controlled workstation 103. Then, in step 308, the user terminal 101 receives the PVC demand data inputted by the user, and transmits it through the ATM network 100 to the PVC control server 102 in response to the key input demanding its transmission. The PVC demand data represents the bandwidth and service time to use the PVC. After receiving the PVC demand data in step 336, the PVC server 102 proceeds to step 338 to transfer the PVC demand data to the operator controlled workstation 103.

When the workstation 103, on standby in step 360, receives the PVC demand data in step 362, it proceeds to step 364 to check the state of the switching system 20 to determine whether there is an available bandwidth. Then, in step 366, the operator controlled workstation 103 generates a signal representing the acceptance or rejection of the PVC demand data and provides that signal to the PVC control server 102. Receiving the signal representing the acceptance or rejection in step 340, the PVC control server 102 transmits it through the ATM network 100 to the user terminal 101. The acceptance or rejection signal generated in the PVC server layer 211 as shown in FIG. 2 is converted by the signaling stack consisting of the third layer 212, SAAL 213 and AAL5 into signaling data transmitted through the ATM layer 215 to the user terminal 101.

Receiving and displaying the acceptance or rejection signal in step 310, the user terminal 101 proceeds to step 312 to determine whether the PVC demand data is accepted or not. In this case, the acceptance or rejection signal is received through the ATM layer 205, and is processed through the signaling stack to the PVC client 201. Detecting the acceptance of the PVC demand data in step 312, the user terminal 101 proceeds to step 318 to complete a connection with the PVC provided by the ATM network 100. On the contrary, in determining the rejection of the PVC demand data instep 312, the user terminal 101 proceeds to step 314 to determine whether there is a demand to change the PVC demand data. Detecting the demand to change the PVC demand, the process returns to step 308; otherwise, the process is terminated. Until now, although described in connection with the PVC control server 102 installed in the telephone exchange office, the procedure may also be applied to the PVC control server 102 installed in the network control center.

As described above, the PVC control server makes the user terminal directly demand a connection with the PVC through the SVC, so that the user need not call up the operator of the exchange office through the PSTN. While the present invention has been described with specific embodiments accompanied by the attached drawings, it will be appreciated by those skilled in the art that various changes and modifications may be made thereto without departing from the gist of the present invention.

What is claimed is:

1. A communication system for allocating a permanent virtual circuit (PVC) to a user terminal connected through an asynchronous transfer mode (ATM) network interface to an ATM network, comprising:

a PVC control server connected through an ATM interface to said ATM network;

a switching system disposed in said ATM network for connecting said user terminal to said PVC control server through a switched virtual circuit (SVC) according to a virtual path identifier (VPI) and a virtual channel identifier (VCI) generated by said user terminal; and an operator controlled workstation connected to said switching system for checking a state of said switching system, for generating a signal in accordance with one of acceptance and rejection of a demand of said user terminal on said PVC, and for providing said generated signal to said PVC control server upon receiving PVC demand data from said user terminal through said PVC control server, said signal generated by said operator controlled workstation being transferred through said SVC to said user terminal.

2. The communication system as defined in claim 1, said operator controlled workstation and said switching system being connected by an Ethernet line.

3. In a communication system for allocating a permanent virtual circuit (PVC) to a user terminal connected through an asynchronous transfer mode (ATM) network interface to an ATM network, said system comprising a PVC control server connected through an ATM interface to said ATM network, a switching system disposed in said ATM network for connecting said user terminal to said PVC control server through a switched virtual circuit (SVC) according to a virtual path identifier (VPI) and a virtual channel identifier (VCI) generated by said user terminal, and an operator controlled workstation connected to said switching system for checking a state of said switching system and for generating a signal in accordance with one of acceptance and rejection of a demand of said user terminal on said PVC, said generated signal being transmitted to said PVC control server upon receiving PVC demand data from said user terminal through said PVC control server, said generated signal being transferred through said SVC to said user terminal;

a method of allocating said PVC to said user terminal, comprising the steps of:

demanding a connection to said ATM network by said user terminal generating a predetermined VPI and a predetermined VCI through a signal channel;

connecting said user terminal to said PVC control server in response to said predetermined VPI and said predetermined VCI;

sending a connection signal and initial data from said PVC control server to said user terminal;

displaying said initial data on said user terminal;

sending said PVC demand data to said PVC control server;

transferring said PVC demand data to said operator controlled workstation for checking said switching system and for generating one of an acceptance signal and a rejection signal transferred to said user terminal; and shifting the connection of said user terminal to said PVC upon receiving the acceptance signal.

4. The method as defined in claim 3, further comprising the steps of:

determining whether to change said PVC demand data upon receiving the rejection signal; and asking for new PVC demand data when it is determined that said PVC demand data must be changed.

5. The communication system as defined in claim 1, wherein, when said PVC control server is installed in a telephone exchange office not acting as a network control center, said PVC control server is connected to said ATM network via an Ethernet line, and said PVC control server is connected via a data line to said operator controlled workstation, which is in turn connected via an Ethernet line to said switching system in said ATM network.

6. The communication system as defined in claim 1, wherein, when said PVC control server is installed in one of a network control center and a telephone exchange office serving as a network control center, said PVC control server is not connected to said operator controlled workstation, but is connected to a network management computer via a data line, and said network management computer is connected via a telecommunication management network to a workstation, which is in turn connected via an Ethernet line to said switching system in said ATM network.

7. The communication system as defined in claim 1, wherein said PVC control server comprises a dedicated line server which is connected to said user terminal through the SVC for transferring data between said user terminal and said operator controlled workstation.

8. The communication system as defined in claim 1, wherein said operator controlled workstation checks the state of said switching system in response to a demand of said user terminal, and transfers to said user terminal information relative to the state of said switching system.

9. The method as defined in claim 3, wherein said PVC control server comprises a dedicated line server which is connected to said user terminal through the SVC for transferring data between said user terminal and said operator controlled workstation.

10. The method as defined in claim 3, wherein said operator controlled workstation checks the state of said switching system in response to a demand of said user terminal, and transfers to said user terminal information relative to the state of said switching system.

11. The method as defined in claim 10, wherein said user terminal demands the connection to said ATM network in accordance with the information relative to the state of said switching system transferred to said user terminal by said operator controlled workstation.

* * * * *